Figure 1:
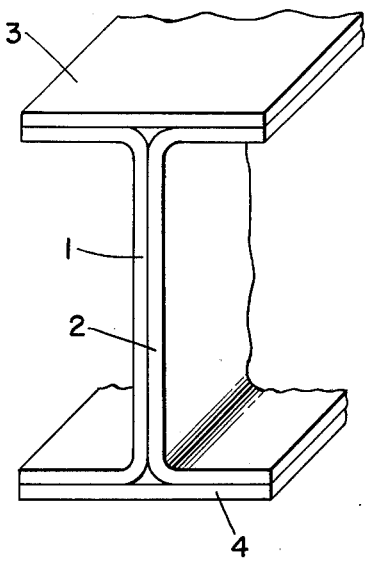

United States Patent [19]

Kreft

[11] 4,020,202
[45] Apr. 26, 1977

[54] BEAM AND STRUT GIRDER

[75] Inventor: Holger Kreft, Karlsfeld, Germany

[73] Assignee: Maschinenfabrik Augsburg-Nurnberg AG, Germany

[22] Filed: July 8, 1974

[21] Appl. No.: 486,349

[30] Foreign Application Priority Data

July 7, 1973 Germany ............................ 2334645

[52] U.S. Cl. .............................. 428/33; 428/366; 428/367; 428/371; 428/373; 428/377; 428/398; 428/902

[51] Int. Cl.² ........................................ B32B 9/00

[58] Field of Search .............. 161/55, 58, 143, 170; 52/729, 731, 732, 729, 730, 731, 732; 138/144; 428/33, 107, 99, 112, 222, 223, 366, 367, 371, 373, 377, 398, 902

[56] References Cited

UNITED STATES PATENTS

| 183,160 | 10/1876 | Haughian | 52/729 |
| 1,377,891 | 5/1921 | Knight | 52/729 |
| 2,230,628 | 2/1941 | Sahlberg | 52/729 |
| 2,785,442 | 3/1957 | Boggs | 138/144 X |
| 3,002,534 | 10/1961 | Noland | 138/144 X |
| 3,350,030 | 10/1967 | Green | 242/118.32 |
| 3,466,219 | 9/1969 | Schwartz | 161/57 |
| 3,472,730 | 10/1969 | Frigstad | 161/144 |

FOREIGN PATENTS OR APPLICATIONS

| 555,517 | 1/1957 | Italy | 428/302 |
| 1,018,289 | 1/1966 | United Kingdom | 428/294 |

Primary Examiner—Marion E. McCamish
Attorney, Agent, or Firm—Craig & Antonelli

[57] ABSTRACT

A beam and strut girder for use in vehicles and in other constructions which comprises a girder construction consisting of a fiber reinforced plastic material.

14 Claims, 4 Drawing Figures

BEAM AND STRUT GIRDER

The present invention relates to a beam and strut girder for application in vehicle and civil engineering.

Both in vehicle engineering (cardinally in the construction of trucks, buses and rail vehicles) and in civil engineering (cardinally in bridge, underground and above-ground construction) the use of metallic beam and strut girders of hollow or diverse other sections (e.g. T and I or H sections and angles with unequal flanges) is in current practice. These metallic girders all suffer from their relatively heavy weight and, moreover, require the use of a corrosion inhibitor.

In civil engineering, use is also made of concrete girders which may or may not be reinforced with steel. While these eliminate the need for protection against corrosion, their strength is inferior to that of the metal girders and requires larger dimensions, which gives them more weight than their counterparts of steel and makes them difficult to transport and store.

In a broad aspect, the present invention provides a beam and strut girder equal in strength or stiffness (high modulus of elasticity) to known steel girders but giving great resistance to corrosion at extraordinarily low weight.

It is a particular object of the present invention to provide a girder which consists of a fiber-reinforced plastic matrix, where use is preferably made of carbon or boron for the reinforcing fiber and of resin for the plastic matrix. The girder of this invention distinguishes itself by its extremely low weight and its extraordinarily great resistance to corrosion. Yet its strength is still notably superior to that of steel girders manufactured of conventional alloys.

Concerning suitable synthetic resins, it is possible to use all epoxy, polyimide and polyamide resins having the required features. One of these resins used is made and sold by the Firm Ciba, Zurich, Switzerland, having the trademark "System X 100 - HT - 907 - DM P 30". This resin is an epoxy resin.

In a further embodiment of the present invention, the reinforcing fiber is embedded in the plastic matrix at an angle of 30° to 60°, preferably 45°, with the longitudinal axis of the girder. In this range of angular position the load capacity of the fiber with respect to flexural stresses and tensile-compressive stresses is an optimum.

In yet a further embodiment of the present invention, the reinforcing fiber is embedded in the plastic matrix in a direction parallel with the centerline of the girder. This makes for maximum load capacity of the component under tensil-compressive stresses.

This invention further relates to a method for manufacturing a beam and strut girder claimed under the present invention. In accordance with this method, a hollow shape or form of suitable section is conventionally wound and hardened over a core removed after shrinking, after which this hollow shape is sectioned, i.e., cut into fractions which are then suitably joined to form the girder in its final shape.

This method of manufacture provides an advantage in that shapes which do not exhibit hollow sections (such as T- or I-girders) and which could not otherwise be wound, can now be manufactured by hollow shape winding. Also, suitable selection of the wound section and use of identical or similar fractions enable a great variety of girder shapes to be manufactured simply by joining the fractions in different fashions. For joining the fractions together, resort can be made, though not exclusively, to cementing, riveting, bolting or combinations thereof.

In a still further aspect of the present invention and the method claimed thereunder, use is made of foamed plastics as a filler core when joining fractions to form girders of sandwich construction. This provides an advantage in that the layers of reinforcing fiber in the plastic matrix are prevented by the foamed plastic inserts, which give additional stiffness, from yielding inwards under load, but does not appreciably add to the weight.

Figure 2:
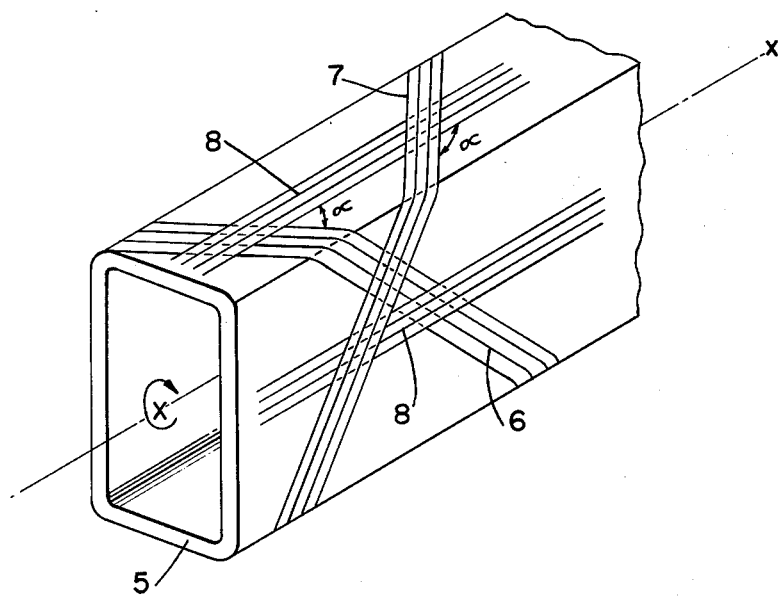
Figure 3:
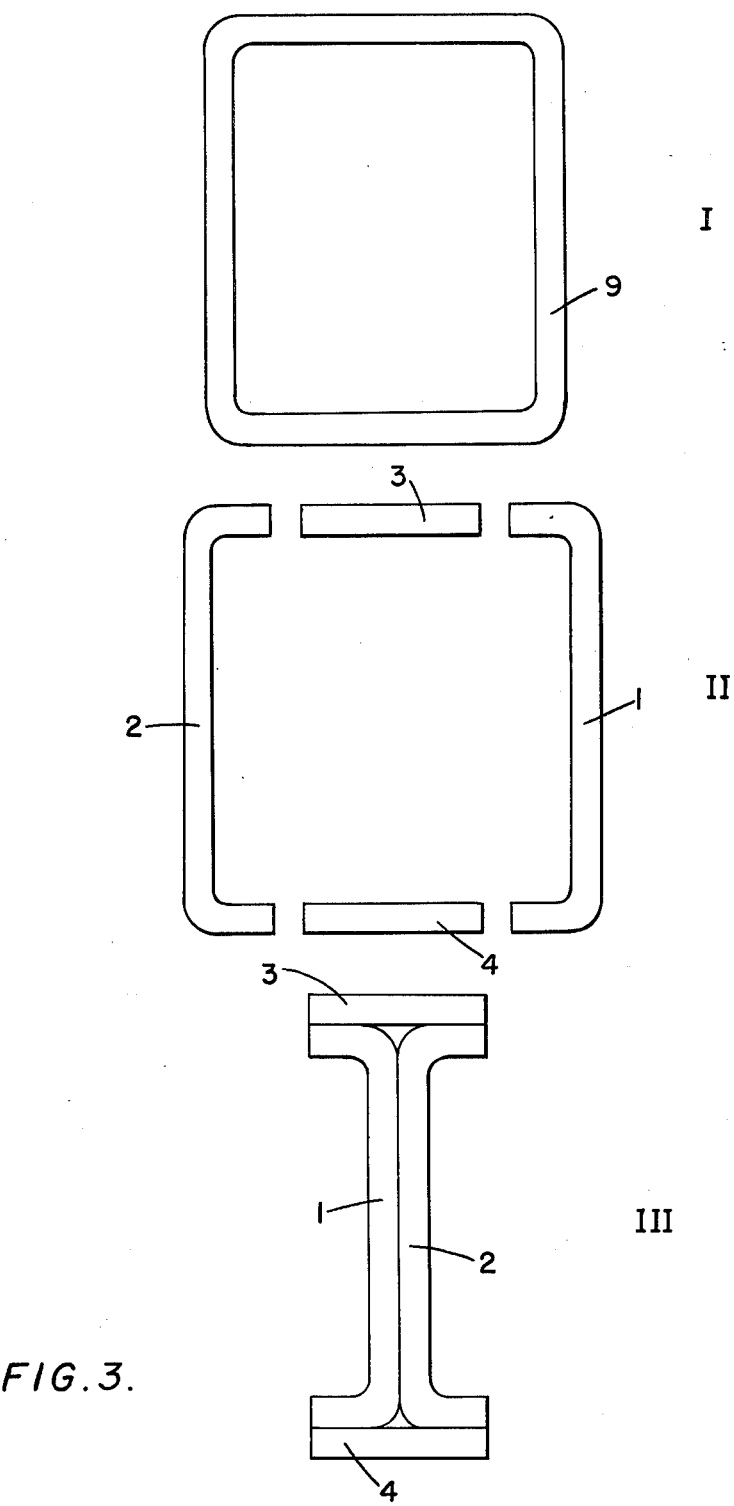
Figure 4:
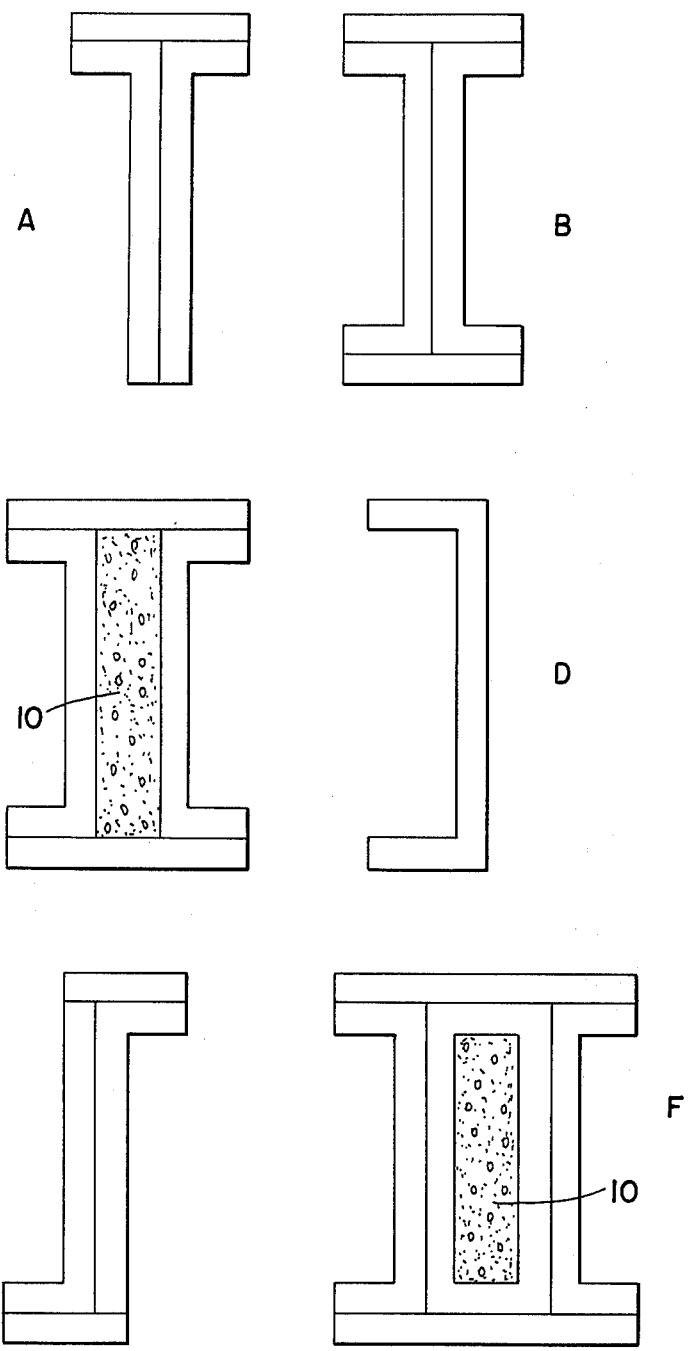

Further objects and advantages of the present invention will become apparent from the following detailed description and the accompanying drawings, in which:

FIG. 1 is a perspective view and illustrates a girder (I-section) assembled in accordance with the present invention;

FIG. 2 is a perspective side view and illustrates a wound hollow shape which after setting is sectioned into fractions for use in the manufacture of girders of this invention; FIG. 3 is a schematic diagram of the manufacturing process for an H or I girder in accordance with this invention; and FIG. 4 illustrates embodiments of various beam and strut girder sections manufactured in accordance with the present invention.

FIG. 1 illustrates a girder (here shown in I-shape) manufactured in accordance with the present invention and consisting of cap plates 3 and 4 and the channel sections 1 and 2 joined together to form an I-section, where the channel sections are united back-to-back and caps 3 and 4 are each attached to two adjacent flanges of the channel sections by suitable operations (such as cementing, bolting, riveting or combinations thereof).

By the method claimed under the present invention, the first step is to conventionally wind a hollow shape of suitable section (perhaps rectangular or square)(- FIG. 2). In the process, reinforcing fiber 6, 7, 8 (e.g. carbon or boron) soaked in a hot setting plastic (e.g. an epoxy resin) is wrapped over a winding spindle 5 (e.g. an aluminum box section) spinning about axis $x-x$ which can later be withdrawn from the wound and set shape (e.g. after reducing its diameter), and the plastic is then allowed to set at an elevated temperature.

The setting of polymide and polyamide resins needs an amount of heat, but there are certain epoxy resins setting at room temperature or even at lower temperatures. Generally, the resin is hardened by temperatures between 80° and 140° C. The fibers may be wrapped in either layers 8 running in parallel with the long direction of the girder or in layers 6 and 7 running at an angle $\alpha = 20°$ to 60°, preferably 45°, with the centerline, where FIG. 2 shows a combination of variously oriented layers of fiber.

The diameter of a single fiber lies between 8 and 10 micrometers; whereas, a bundle of fibers, as is used for the reinforcing fiber of the invention, consists of between 5,000 and 20,000 single fibers.

The spindle, made of aluminum, is shrunk, whereby usually liquid nitrogen is used. After shrinking of the spindle, the spindle can easily be drawn out of the hollow body. The spindle with plastic coated windings are put into a container filled up with liquid nitrogen or filled partly with liquid nitrogen and nitrogen vapor. Hereby, the aluminum spindle shrinks more than the windings. The cool spindle and windings are removed out of the container, immediately after removing, the spindle is pushed out of the windings, e.g. by use of a hydraulic presser.

It is possible, to use steel instead of aluminum, or for example, some kind of stiff foam material. In the latter case the foam material remains in the hollow body. The weight ratio of fiber material in the girder is on the order of 60%, i.e., for example, two kiloponds of resin are coated on three kiloponds of fibers.

FIG. 3 is a schematic diagram and shows the manufacturing process for a girder of I-section assembled in accordance with this invention.

In manufacturing step I, a suitable hollow shape 9 is wound (see also FIG. 2) and hardened, and in manufacturing step II, it is sectioned into fractions 1, 2, 3, 4, e.g. by cutting with a sawing device. In manufacturing step III, these fractions are then composed by suitable joining operations (perhaps cementing or bolting) to form the I-section girder. The cements employed depend on the kind of use of the girder, e.g. at very low temperature. Important is that the cement does not contain any dissolving agent. Possible is the use of a cement of the polyurethane group. If suitably sectioned and composed the same hollow starting section will yield a great variety of girder shapes, some of which are shown in FIG. 4. The section indicated in FIG. 4 by the letter B has already been shown in FIGS. 1 and 3 (I-section); shape A is for a T-girder, B for a channel-section girder, and E for a Z-section girder, where for a girder of channel section D, joining is obviated. The girder sections C and F have inserts 10 of aerated or foamed plastic, where C is a sandwich shape and F a box construction. The foamed plastic employed is e.g. of polyurethane or of polyvinylchloride.

The girder sections shown on the drawings constitute but a very small selection of the girder shapes which can be achieved with the method claimed under this invention, and it is intended that the invention embrace more particularly also all hollow sections that can be wound directly.

What is claimed is:

1. A beam and strut girder for application in vehicles and civil engineering, which comprises a girder structure having a longitudinal centerline and consisting of reinforcing fibers made of carbon or boron embedded within a plastic matrix; said reinforcing fibers being embedded in the plastic matrix at an angle of 30° to 60° with said longitudinal centerline and said girder structure being formed of at least one shaped section comprising a fraction of a hollow shaped body, said body having windings of said reinforcing fibers positioned within said plastic matrix.

2. The beam and strut girder of claim 1, wherein the plastic matrix is made of a synthetic resin.

3. The beam and strut girder of claim 1, wherein the reinforcing fibers are embedded in the plastic matrix at an angle of 45° with the longitudinal centerline of the girder.

4. The beam and strut girder of claim 1, wherein additional reinforcing fibers are embedded in the plastic matrix in a direction parallel with the longitudinal centerline of the girder.

5. The beam and strut girder of claim 1, wherein the girder structure comprises a plurality of shaped sections joined together, each of said sections comprising a fraction of a hollow shaped body, said body having windings of said reinforcing fibers positioned within said plastic matrix.

6. The beam and strut girder of claim 5, wherein said sections are joined to each other by adhesive cement.

7. The beam and strut girder of claim 5, wherein said sections are joined together by bolts.

8. The beam and strut girder of claim 5, wherein said windings are positioned at said angle about a longitudinal axis of said hollow shaped body.

9. The beam and strut girder of claim 1, wherein said plastic matrix is made of a synthetic resin selected from the group consisting of epoxy, polyimide and polyamide resins.

10. The beam and strut girder of claim 1, wherein said girder structure comprises a plurality of shaped sections joined together, each of said sections comprising a fraction of a hollow shaped body, said body having winding of said reinforcing fibers positioned within said plastic matrix, and a foamed plastic providing a filler core located between adjacent sections within said girder structure.

11. The beam and strut girder of claim 1, wherein said girder structure is formed from at least three shaped sections joined to each other, each shaped section comprising a fraction of a hollow shaped body having a rectangular cross-section, two of said shaped sections being identical angled sections and another being a plate section.

12. The beam and strut girder of claim 11, wherein said shaped sections include two plate sections and two identical angled sections arranged to form a girder having an I-shaped cross-section.

13. The beam and strut girder of claim 11, wherein said shaped sections include one plate section and two identical L-shaped sections arranged to form a girder having a T-shaped cross-section.

14. The beam and strut girder of claim 11, wherein said shaped sections include two plate sections and two identical L-shaped sections arranged to form a girder having a Z-shaped cross-section.

* * * * *